United States Patent
Parrish (10) Patent No.: US 10,239,567 B1
(45) Date of Patent: Mar. 26, 2019

(54) EXTENDABLE TRUCK BED

(71) Applicant: Alice Parrish, Charlotte, NC (US)

(72) Inventor: Alice Parrish, Charlotte, NC (US)

( * ) Notice: Subject to any disclaimer, the term of this patent is extended or adjusted under 35 U.S.C. 154(b) by 0 days.

(21) Appl. No.: 15/728,910

(22) Filed: Oct. 10, 2017

(51) Int. Cl.
| B62D 33/08 | (2006.01) |
| B62D 33/027 | (2006.01) |
| F16H 19/06 | (2006.01) |

(52) U.S. Cl.
CPC ........... *B62D 33/08* (2013.01); *B62D 33/027* (2013.01); *F16H 19/06* (2013.01)

(58) Field of Classification Search
CPC ............................. B62D 33/027; B62D 33/08
USPC ....... 296/10, 26.08, 26.09, 26.1, 26.01, 57.1
See application file for complete search history.

(56) References Cited

U.S. PATENT DOCUMENTS

| 2,284,419 | A | * | 5/1942 | Greig | B60R 5/041 224/510 |
| 3,004,790 | A | * | 10/1961 | Mayer | B60R 5/041 296/26.09 |
| 5,456,511 | A | * | 10/1995 | Webber | B60P 1/00 296/26.09 |
| 5,564,767 | A | | 10/1996 | Strepek | |
| 5,669,654 | A | * | 9/1997 | Eilers | B60P 1/003 296/26.11 |
| 5,816,637 | A | * | 10/1998 | Adams | B60P 3/40 296/26.09 |
| 5,924,753 | A | * | 7/1999 | DiBassie | B62D 33/0273 296/26.09 |
| 5,938,262 | A | | 8/1999 | Mills | |
| 6,367,858 | B1 | * | 4/2002 | Bradford | B60P 3/40 296/26.09 |
| 6,491,331 | B1 | | 12/2002 | Fox | |
| 6,601,899 | B2 | * | 8/2003 | Kiester | B60P 3/40 224/496 |
| 6,644,707 | B2 | * | 11/2003 | McLaughlin | B60R 5/041 224/311 |
| 6,659,524 | B1 | | 12/2003 | Carlson | |
| 7,121,603 | B2 | | 10/2006 | Stevenson | |
| 7,140,657 | B2 | * | 11/2006 | Cuma | B60J 5/101 296/26.1 |
| 7,232,172 | B2 | * | 6/2007 | Kiester | B60P 3/40 296/26.08 |
| 8,020,911 | B2 | | 9/2011 | McKelvey | |
| 8,534,735 | B2 | * | 9/2013 | McManus | B62D 47/003 296/26.08 |

(Continued)

FOREIGN PATENT DOCUMENTS

CA        2223306 A1       12/1997

*Primary Examiner* — Dennis H Pedder (57) ABSTRACT

The extendable truck bed comprises and extension bed floor and extensible side panels that allow the cargo bed of a pickup truck to be expanded so as to provide an increased cargo capacity. The extendable truck bed moves from a 'nominal bed length' position to an 'extended bed length' position under control of one or more operator controls that may be located in the cab of the truck. In the 'nominal bed length' position the extension bed floor is located beneath the truck bed floor and the extensible panels are located in a left side panel pocket and a right side panel pocket in the side walls of the truck bed. A left side motor and right side motor drive a left side flexible linkage and a right side flexible linkage to move the extension bed floor and extensible side panels to the 'extended bed length' position.

15 Claims, 6 Drawing Sheets

(56) References Cited

U.S. PATENT DOCUMENTS

| | | | | |
|---|---|---|---|---|
| 9,789,913 | B2 * | 10/2017 | Singer | B62D 21/14 |
| 2002/0037203 | A1 * | 3/2002 | Kiester | B60P 3/40 |
| | | | | 410/129 |
| 2002/0105201 | A1 * | 8/2002 | Melotik | B60R 5/041 |
| | | | | 296/26.09 |
| 2002/0153736 | A1 | 10/2002 | Goodyear | |
| 2003/0141733 | A1 * | 7/2003 | Burg | 296/26.09 |
| 2003/0164622 | A1 * | 9/2003 | De Gaillard | B60P 3/40 |
| | | | | 296/26.09 |
| 2005/0001442 | A1 * | 1/2005 | Cuma | B60J 5/101 |
| | | | | 296/26.09 |
| 2006/0226673 | A1 * | 10/2006 | Miller | B60P 1/431 |
| | | | | 296/61 |
| 2009/0284036 | A1 * | 11/2009 | Clayton | B60P 3/40 |
| | | | | 296/26.09 |
| 2014/0042765 | A1 * | 2/2014 | McManus | B62D 31/00 |
| | | | | 296/26.09 |
| 2016/0214657 | A1 * | 7/2016 | Topolovec | B62D 33/027 |
| 2018/0134205 | A1 * | 5/2018 | Karumuri | B60P 3/40 |

\* cited by examiner

EXTENDABLE TRUCK BED

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicular cargo, more specifically, an extendable truck bed.

SUMMARY OF INVENTION

The extendable truck bed comprises and extension bed floor and extensible side panels that allow the cargo bed of a pickup truck to be expanded so as to provide an increased cargo capacity. The extendable truck bed moves from a 'nominal bed length' position to an 'extended bed length' position under control of one or more operator controls that may be located in the cab of the truck. In the 'nominal bed length' position the extension bed floor is located beneath the truck bed floor and the extensible panels are located in a left side panel pocket and a right side panel pocket in the side walls of the truck bed. A left side motor and right side motor drive a left side flexible linkage and a right side flexible linkage to move the extension bed floor and extensible side panels to the 'extended bed length' position.

An object of the invention is to provide a truck bed that can be moved between a 'nominal bed length' position and an 'extended bed length' position.

Another object of the invention is to store the extension bed floor under the truck bed floor and to store the extensible side panels into side panel pockets when in the 'nominal bed length' position.

A further object of the invention is to provide left and right side cables to prevent the tailgate from dropping and to store the cables on spring-tensioned cable spools.

Yet another object of the invention is to provide one or more operator controls that allow the extendable tuck bed to be operated from the cab of the truck.

These together with additional objects, features and advantages of the extendable truck bed will be readily apparent to those of ordinary skill in the art upon reading the following detailed description of the presently preferred, but nonetheless illustrative, embodiments when taken in conjunction with the accompanying drawings.

In this respect, before explaining the current embodiments of the extendable truck bed in detail, it is to be understood that the extendable truck bed is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the extendable truck bed.

It is therefore important that the claims be regarded as including such equivalent construction insofar as they do not depart from the spirit and scope of the extendable truck bed. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
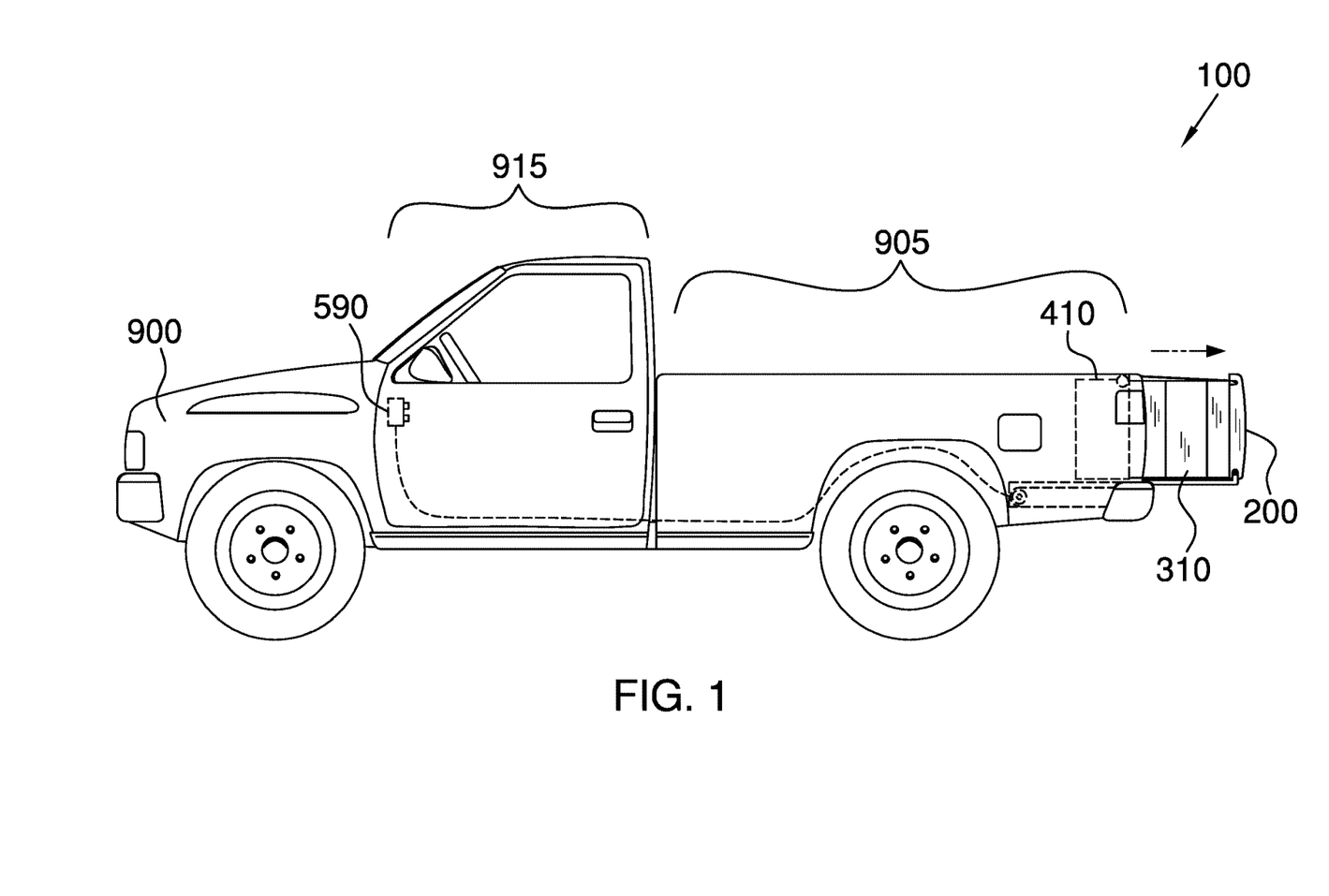
FIG. 1 is a side view of an embodiment of the disclosure.
Figure 2:
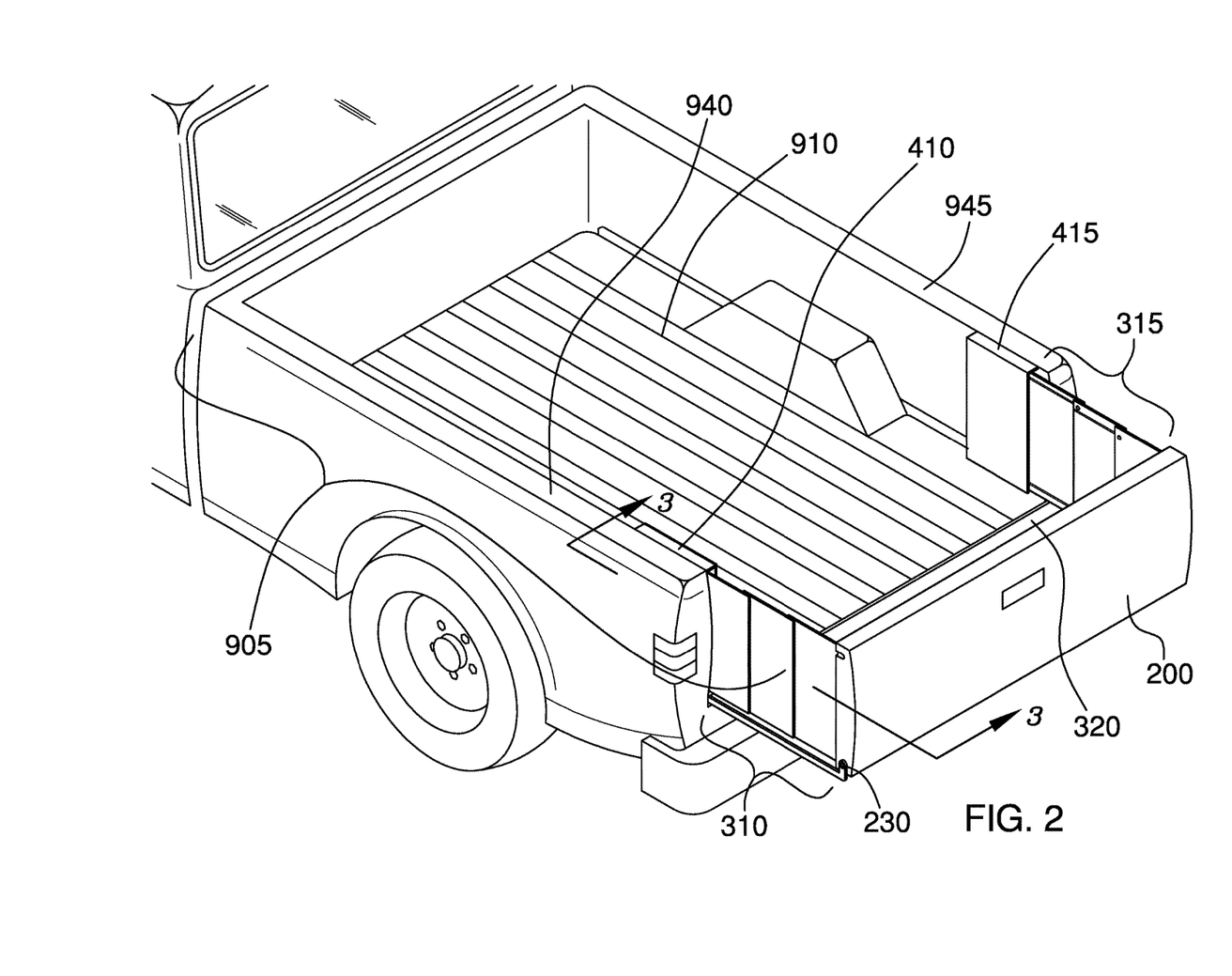
FIG. 2 is a perspective view of an embodiment of the disclosure.
Figure 3:
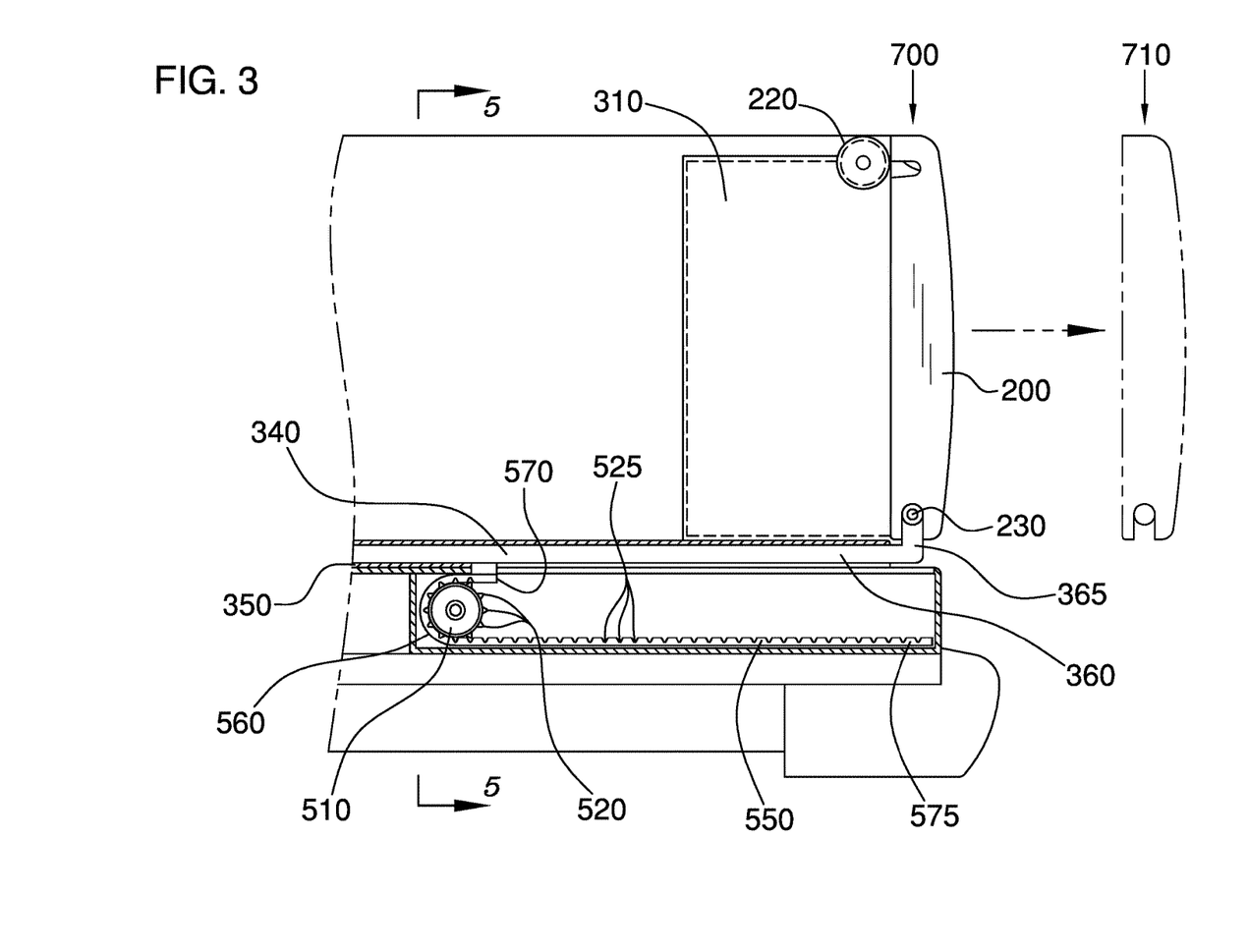
FIG. 3 is a cross-sectional view of an embodiment of the disclosure across 3-3 as shown in FIG. 2 in the 'nominal bed length' position and with the tailgate 'upright and closed'.
Figure 4:
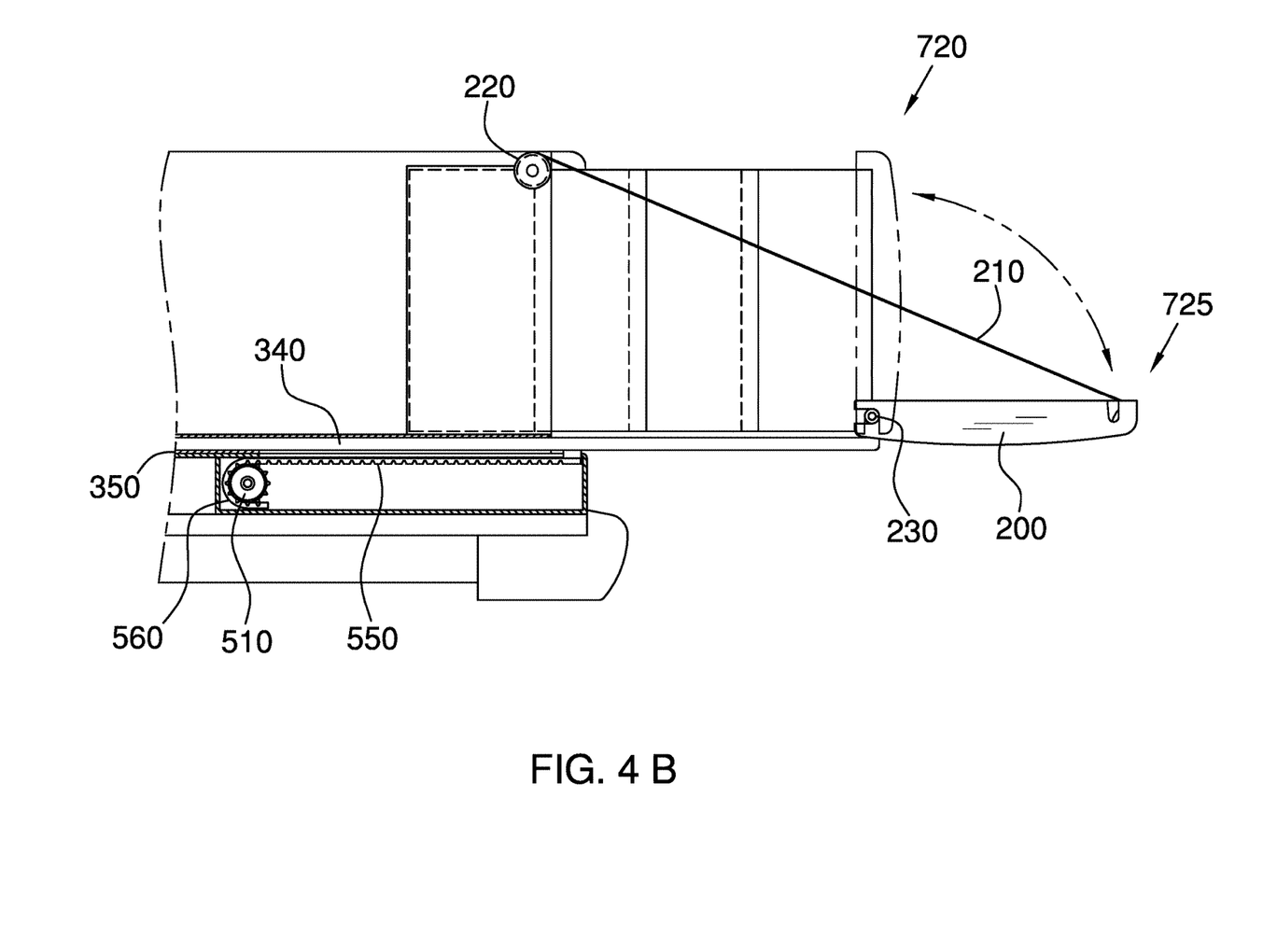
FIG. 4A is a cross-sectional view of an embodiment of the disclosure across 3-3 as shown in FIG. 2 in the 'extended bed length' position and with the tailgate 'upright and closed'.
FIG. 4B is a cross-sectional view of an embodiment of the disclosure across 3-3 as shown in FIG. 2 in the 'extended bed length' position and with the tailgate 'lowered'.
Figure 4A:
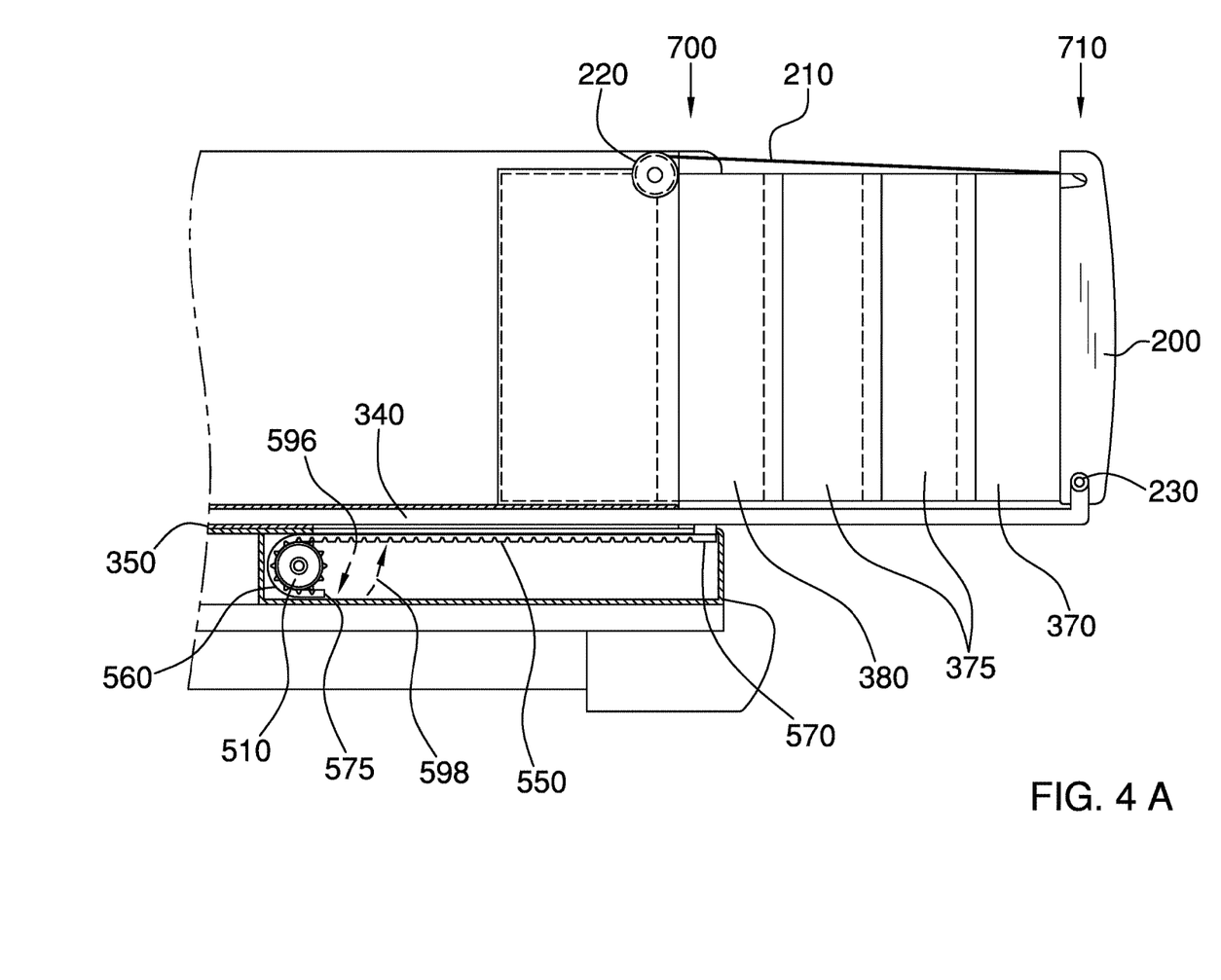
Figure 5:
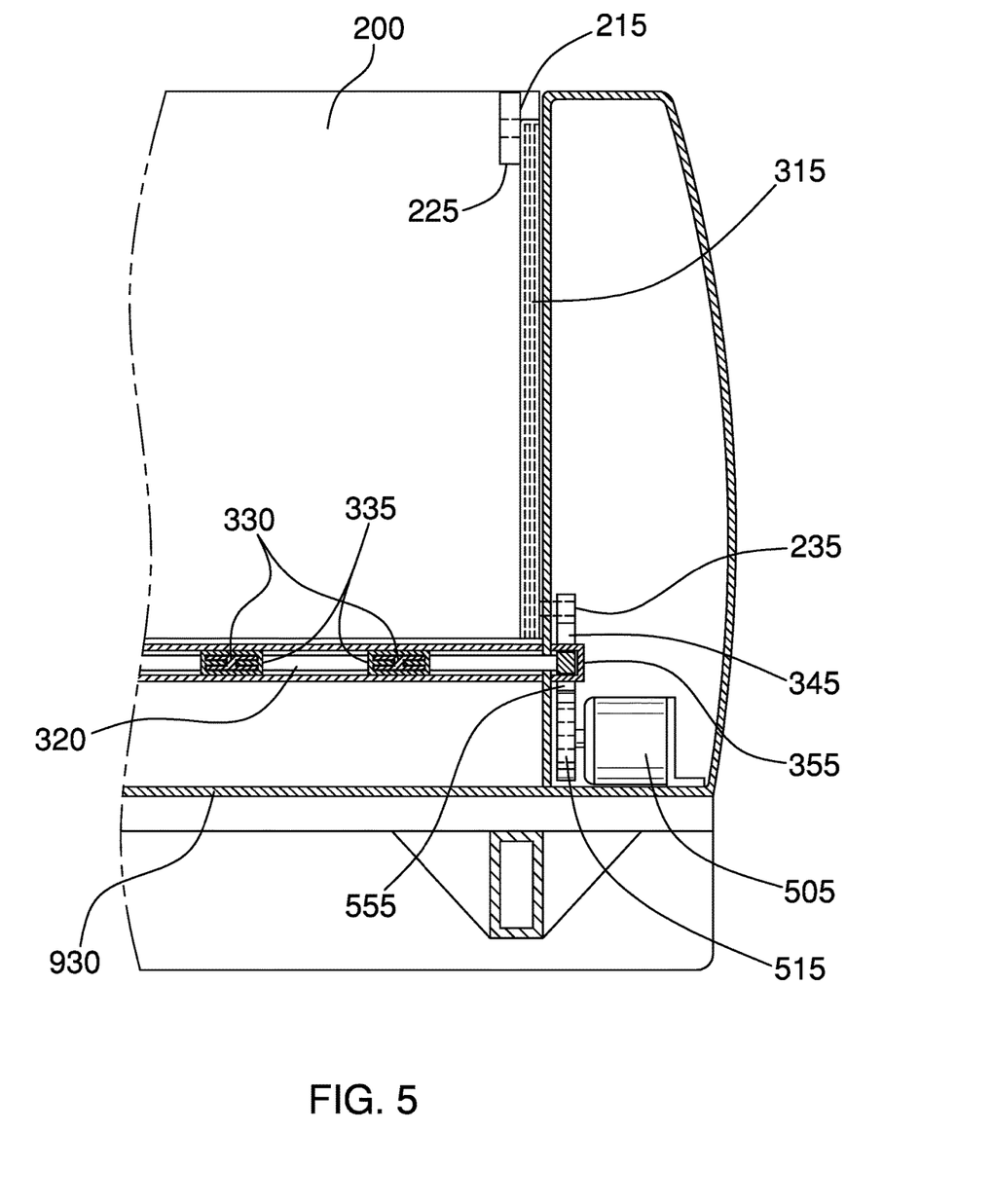
FIG. 5 is a cross-sectional view of an embodiment of the disclosure across 5-5 as shown in FIG. 3.

Detailed reference will now be made to a first potential embodiment of the disclosure, which is illustrated in FIGS. 1 through 5.

The extendable truck bed 100 (hereinafter invention) comprises an extension bed floor 320, plurality of extension bed sliding rails 330, plurality of extension bed rail guides 335, a left extension arm 340, a right extension arm 345, a left extension arm guide rail 350, a right extension arm guide rail 355, a plurality of left side extension panels 310, a plurality of right side extension panels 315, a left side panel pocket 410, a right side panel pocket 415, a tailgate 200, a left tailgate cable 210, a right tailgate cable 215, a left cable spool 220, a right cable spool 225, a left tailgate hinge 230, a right tailgate hinge 235, a left electric motor (not illustrated in the figures), a right electric motor 505, a left sprocket 510, a right sprocket 515, a left flexible linkage 550, a right flexible linkage 555, a left linkage track 560, a right linkage track (not shown in the figures), and one or more operator controls 590.

The invention 100 provides increased storage space in a truck bed 905 of a pickup truck 900 by allowing the tailgate 200 to move from a 'nominal bed length' position 700 to a 'extended bed length' position 710. In the 'extended bed length' position 710, the tailgate 200 is farther away from a cab 915 of the pickup truck 900 than it is in the 'nominal bed length' position 700. The plurality of left side extension panels 310 and the plurality of right side extension panels 315 telescope out of the left side panel pocket 410 and the right side panel pocket 415, respectively, to extend the sides of the truck bed 905 when the tailgate 200 is in the 'extended bed length' position 710. The extension bed floor 320 slides out from under a truck bed floor 910 to extend the truck bed floor 910 when the tailgate 200 is in the 'extended bed length' position 710.

The extension bed floor 320 may be a flat or corrugated metal panel that slides out from under the truck bed floor 910 when the tailgate 200 is placed into the 'extended bed length' position 710. When the tailgate 200 is in the 'nominal bed length' position 700, the extension bed floor 320 may reside directly beneath the truck bed floor 910. The extension bed floor 320 may be oriented to be parallel to the truck bed floor 910. The width of the extension bed floor 320 may be the width of the truck bed floor 910 and the length of the extension bed floor 320 may vary based upon the size of the pickup truck 900 with lengths of 1 to 4 ft being typical. The underside of the extension bed floor 320 may be coupled to the plurality of extension bed sliding rails 330.

The plurality of extension bed sliding rails 330 may be oriented to run from front to back. The plurality of extension bed sliding rails 330 may be slidably coupled to the plurality of extension bed rail guides 335. The plurality of extension bed rail guides 335 may be coupled to a frame 930 of the pickup truck 900. As the tailgate 200 transitions from the 'nominal bed length' position 700 to the 'extended bed length' position 710, or vice versa, the plurality of extension bed sliding rails 330 may slide out of or into the plurality of extension bed rail guides 335 and this may allow the extension bed floor 320 to move relative to the truck bed floor 910.

The left extension arm 340 and the right extension arm 345 each comprise an 'L'-shaped member. A long leg 360 of the 'L'-shaped member is oriented horizontally from front to back. A short leg 365 of the 'L'-shaped member is oriented to extend upward from the back end of the long leg 360. The left extension arm 340 and the right extension arm 345 are located on the left and right side of the truck bed floor 910, respectively. The left tailgate hinge 230 may be pivotally coupled to the left extension arm 340 and the right tailgate hinge 235 may be pivotally coupled to the right extension arm 345. The left extension arm 340 and the right extension arm 345 therefore support the tailgate 200.

The left extension arm 340 and the right extension arm 345 may be slidably coupled to the left extension arm guide rail 350 and to the right extension arm guide rail 355, respectively. The left extension arm guide rail 350 and the right extension arm guide rail 355 may be coupled to the frame 930 of the pickup truck 900. As the tailgate 200 transitions from the 'nominal bed length' position 700 to the 'extended bed length' position 710, or vice versa, the left extension arm 340 and the right extension arm 345 may slide out of or into the left extension arm guide rail 350 and the right extension arm guide rail 355, respectively.

The plurality of left side extension panels 310 comprises a set of panels that reside in the left side panel pocket 410 when the tailgate 200 is in the 'nominal bed length' position 700 and which telescope out of the left side panel pocket 410 when the tailgate 200 is moved to the 'extended bed length' position 710.

The plurality of left side extension panels 310 may comprise a rearmost extension panel 370, one or more intermediate extension panels 375, and a frontmost extension panel 380. The rearmost extension panel 370, the one or more intermediate extension panels 375, and the frontmost extension panel 380 may be flat plates that are oriented to be perpendicular to both the truck bed floor 910 and to the tailgate 200. The rearmost extension panel 370, the one or more intermediate extension panels 375, the frontmost extension panel 380 may be parallel to each other and adjacent to each other when the tailgate 200 is in the 'nominal bed length' position 700. When the tailgate 200 is moved to the 'extended bed length' position 710, the rearmost extension panel 370, the one or more intermediate extension panels 375, and the frontmost extension panel 380 may each move a different distance towards the rear.

The rearmost extension panel 370, the one or more intermediate extension panels 375, and the frontmost extension panel 380 may each comprise one or more lips, channels, or other interlocks (not shown in the illustrations) to assure that they do not separate from each other as they slide past each other. Having the rearmost extension panel 370 and the frontmost extension panel 380 interlock assures that movement of the tailgate 200 and the extension bed floor 320 towards the 'extended bed length' position 710 will also extend the rearmost extension panel 370, the one or more intermediate extension panels 375, and the frontmost extension panel 380. When the tailgate 200 is moved to the 'nominal bed length' position 700, the rearmost extension panel 370, the one or more intermediate extension panels 375, and the frontmost extension panel 380 are compressed between the tailgate 200 and the left side panel pocket 410, causing the rearmost extension panel 370, the one or more intermediate extension panels 375, and the frontmost extension panel 380 to slide past each other to their adjacent positions inside of the left side panel pocket 410.

The rearmost extension panel 370 may be coupled to the left extension arm 340 and/or to the extension bed floor 320. The left side panel pocket 410 may limit forward motion of the frontmost extension panel 380 so that the frontmost extension panel 380 does not exit the left side panel pocket 410 completely. As a non-limiting example, lips, channels, or other interlocks (not shown the figures) on the left side panel pocket 410 and the frontmost extension panel 380 may interlock when only the rear edge of the frontmost extension panel 380 remains in the left side panel pocket 410. The plurality of right side extension panels 315 and the right side panel pocket 415 are mirror images of the plurality of left side extension panels 310 and the left side panel pocket 410.

The left side panel pocket 410 and the right side panel pocket 415 each comprise a hollow space in a left side wall 940 and a right side wall 945 of the pickup truck 900, respectively. The rear side of the left side panel pocket 410 and the rear side of the right side panel pocket 415 are open so that the plurality of left side extension panels 310 and the plurality of right side extension panels 315 may pass into and out of the left side panel pocket 410 and the right side panel pocket 415.

The tailgate 200 may be a rear wall of the truck bed 905. The tailgate 200 may prevent a cargo (not illustrated in the figures) from sliding out of the truck bed 905 when the pickup truck 900 is moved. When the tailgate 200 is moved to the 'extended bed length' position 710, the truck bed 905 may hold longer cargo items than when the tailgate 200 is in the 'nominal bed length' position 700.

The bottom of the tailgate 200 is hinged and may therefore pivot around the left tailgate hinge 230 and the right tailgate hinge 235. The tailgate 200 may be pivoted between an 'upright and closed' position 720 and a 'lowered' position 725. In the 'upright and closed' position 720 the tailgate 200 extends vertically up from the left tailgate hinge 230 and the right tailgate hinge 235. In the 'lowered' position 725 the tailgate 200 extends horizontally from the left tailgate hinge 230 and the right tailgate hinge 235 in a direction away from the cab 915 of the pickup truck 900.

The right tailgate cable 215 may be coupled to the upper right end of the tailgate 200 and may prevent the tailgate 200 from dropping. The right tailgate cable 215 pulls on the tailgate 200 to assist in closing it when the tailgate 200 is in the 'upright and closed' position 720. When the tailgate 200 is pivoted to the 'lowered' position 725, the right tailgate cable 215 may prevent the tailgate 200 from dropping below a horizontal orientation.

The right tailgate cable 215 may be wrapped around the right cable spool 225. The right cable spool 225 may be a spring-tensioned spool. Specifically, an internal spring (not illustrated in the figures) within the right cable spool 225 may tend to rotate the right cable spool 225 in a direction that shortens the right tailgate cable 215 by wrapping the right tailgate cable 215 around the right cable spool 225. The left tailgate cable 210 and the left cable spool 220 are a mirror image of the right tailgate cable 215 and the right cable spool 225.

The right electric motor 505 may be located in the right side wall 945 of the truck bed 905. The right electric motor 505 may be oriented with its rotational axis horizontal and running front left to right. The right electric motor 505 may be powered from a vehicle electrical system (not illustrated in the figures) and controlled from the cab 915 by the one or more operator controls 590.

The right electric motor 505 may cause the tailgate 200 to move between the 'nominal bed length' position 700 and the 'extended bed length' position 710. Specifically, the right electric motor 505 may be coupled to the right sprocket 515 such that rotation of the right electric motor 505 causes rotation of the right sprocket 515. The right flexible linkage 555 may be a belt, chain, or other linkage between the right sprocket 515 and the right extension arm 345. The right sprocket 515 may engage with the right flexible linkage 555 via a plurality of teeth 520 on the right sprocket 515 fitting into a plurality of notches 525 on the right flexible linkage 555. Rotation of the right electric motor 505 is thus translated into linear motion of the right flexible linkage 555. The right linkage track may guide the movements of the right flexible linkage 555 and may change its direction of travel by 180 degrees. A first end 570 of the right flexible linkage 555 may be coupled to the right extension arm 345. A second end 575 of the right flexible linkage 555 may be left uncoupled and is free to move as the right sprocket 515 rotates. When the right sprocket rotates in a first rotational direction it causes the right flexible linkage to push the right extension arm towards the rear of the pickup truck, thus moving the tailgate to the extended bed length position. When the right sprocket rotates in a second rotational direction it causes the right flexible linkage to pull the right extension arm towards the front of the pickup truck, thus moving the tailgate to the nominal bed length position.

When the right sprocket 515 rotates in a first rotational direction 596 it may cause the right flexible linkage 555 to push the right extension arm 345 towards the rear of the pickup truck 900, thus moving the tailgate 200 to the 'extended bed length' position 710. When the right sprocket 515 rotates in a second rotational direction 598 it may cause the right flexible linkage 555 to pull the right extension arm 345 towards the front of the pickup truck 900, thus moving the tailgate 200 to the 'nominal bed length' position 700.

The direction of rotation of the right electric motor 505 may be determined by the polarity of the electrical energy applied to the right electric motor 505. The one or more operator controls 590 may block the flow of electrical energy to the right electric motor 505 in which case the right electric motor 505 stops rotating. The one or more operator controls 590 may apply electrical energy having a first polarity to the right electric motor 505, causing the right electric motor 505 and the right sprocket 515 to rotate in the first rotational direction 596. The one or more operator controls 590 may apply electrical energy having a second polarity to the right electric motor 505, causing the right electric motor 505 and the right sprocket 515 to rotate in the second rotational direction 598. The left electric motor, the left sprocket 510, the left flexible linkage 550, and the left linkage track 560 are mirror images of the right electric motor 505, the right sprocket 515, the right flexible linkage 555, and the right linkage track.

The right electric motor 505 and the left electric motor are wired to rotate in directions that complement each other. Specifically, if the right electric motor 505 is rotating in a direction that causes the tailgate 200 to move towards the 'extended bed length' position 710, then the left electric motor is also rotating in a direction that causes the tailgate 200 to move towards the 'extended bed length' position 710 and if the right electric motor 505 is rotating in a direction that causes the tailgate 200 to move towards the 'nominal bed length' position 700, then the left electric motor is also rotating in a direction that causes the tailgate 200 to move towards the 'nominal bed length' position 700.

In some embodiments, one or more sensors (not illustrated in the figures) may sense the presence of an object within the truck bed 905 and may prevent the tailgate 200 from moving to the 'nominal bed length' position 700 if doing so would press the tailgate 200 against the object. As non-limiting examples, the one or more sensors may comprise one or more infrared or visible light beams, proximity sensors, pressure switches, or a combination thereof. It shall be noted that the pickup truck 900 may include a backup camera that works in concert with a display in the cab 915 of the pickup truck 900. Moreover, the display 900 would be able to show cargo and the extendable truck bed as it moves.

It shall be duly noted that the one or more operator controls 590 may be positioned inside of the cab 915 of the pickup truck 900 (as currently depicted). Moreover, the one or more operator controls 590 may be provided outside of the pickup truck 900, as on an external surface of the pickup truck 900 such that end user is able to depress buttons in order to manipulate the invention 100 as needed. Moreover, the one or more operator controls 590 may be provided on a key fob or on an app via a smartphone.

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, "cargo" refers to one or more objects that are intended to be transported using a vehicle.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", mean connected, either directly or indirectly and does not necessarily imply a mechanical connection.

As used in this disclosure, an "electric motor" is a device that converts electric energy into rotational mechanical energy.

As used herein, "front" means 1) the side of a vehicle that is closest to a forward direction of travel under normal use of the vehicle or 2) the side or part of an object that normally presents itself to view or that is normally used first. "Rear" or "back' is the side opposite the front.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the term "intermediate" refers to a location that lies between a first object and a second object As used in this disclosure, a "light" is an electrical device that generates visible light to illuminate objects so they can be seen.

As used herein, the term "mirror image" refers to an object that has its parts reversely arranged in comparison with another similar object or that is reversed with reference to an intervening axis or plane.

As used in this disclosure, "orientation" refers to the positioning and/or angular alignment of a first object relative to a second object or relative to a reference position or reference direction.

As used in this disclosure, a "pickup truck" is a vehicle having an enclosed cab and an open body comprising low sides and a tailgate. The vehicle is typically powered by an internal combustion engine.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "spool" is a cylindrical device upon which a flexible material, including but not limited to a rope, a cable, a yarn, a cord, or a tape, can be wound. Depending on context, a spool may also contain the flexible material stored upon the spool.

As used in this disclosure, a "spring" is a device that is used to store mechanical energy. This mechanical energy will often be stored by deforming an elastomeric material that is used to make the device, by the application of a torque to a rigid structure, or by a combination thereof. In some embodiments, the rigid structure to which torque is applied may be composed of metal or plastic.

As used in this disclosure, a "tailgate" is a hinged door mounted on the rear of a pickup truck that can be lowered and, in some embodiments, removed in order to facilitate loading of the pickup truck.

As used in this disclosure, a "track" is a device that is used to control the path of motion of an object in at least one dimension.

As used in this disclosure, a "vehicle" is a device that is used for transporting passengers, goods, or equipment.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An extendable truck bed comprising:
an extension bed floor, plurality of extension bed sliding rails, plurality of extension bed rail guides, a plurality of left side extension panels, a plurality of right side extension panels, a left side panel pocket, a right side panel pocket, a tailgate, and one or more operator controls;
wherein the extendable truck bed provides increased storage space in a truck bed of a pickup truck by moving the tailgate from a nominal bed length position to an extended bed length position;
wherein in the extended bed length position, the tailgate is farther away from a cab of the pickup truck than it is in the nominal bed length position;
wherein the plurality of left side extension panels and the plurality of right side extension panels telescope out of the left side panel pocket and the right side panel pocket, respectively, to extend the sides of the truck bed when the tailgate is in the extended bed length position;
wherein the extension bed floor slides out from under a truck bed floor to extend the truck bed floor when the tailgate is in the extended bed length position;

wherein the plurality of extension bed sliding rails are oriented to run from front to back;
wherein the plurality of extension bed sliding rails are slidably coupled to the plurality of extension bed rail guides;
wherein the plurality of extension bed rail guides are coupled to a frame of the pickup truck;
wherein as the tailgate transitions from the nominal bed length position to the extended bed length position, or vice versa, the plurality of extension bed sliding rails slide out of or into the plurality of extension bed rail guides and allow the extension bed floor to move relative to the truck bed floor;
wherein a left extension arm and a right extension arm each comprise an 'L'-shaped member;
wherein a long leg of the 'L'-shaped member is oriented horizontally from front to back;
wherein a short leg of the 'L'-shaped member is oriented to extend upward from the back end of the long leg;
wherein the left extension arm and the right extension arm are located on the left and right side of the truck bed floor, respectively;
wherein a left tailgate hinge is pivotally coupled to the left extension arm;
wherein a right tailgate hinge is pivotally coupled to the right extension arm;
wherein the left extension arm and the right extension arm therefore support the tailgate.

2. The extendable truck bed according to claim 1
wherein the left extension arm and the right extension arm are slidably coupled to a left extension arm guide rail and to a right extension arm guide rail, respectively;
wherein the left extension arm guide rail and the right extension arm guide rail are coupled to the frame of the pickup truck;
wherein as the tailgate transitions from the nominal bed length position to the extended bed length position, or vice versa, the left extension arm and the right extension arm slide out of or into the left extension arm guide rail and the right extension arm guide rail, respectively.

3. The extendable truck bed according to claim 2
wherein the plurality of left side extension panels comprises a set of panels that reside in the left side panel pocket when the tailgate is in the nominal bed length position and which telescope out of the left side panel pocket when the tailgate is moved to the extended bed length position.

4. The extendable truck bed according to claim 3
wherein the plurality of left side extension panels comprise a rearmost extension panel, one or more intermediate extension panels, and a frontmost extension panel;
wherein the rearmost extension panel, the one or more intermediate extension panels, and the frontmost extension panel are flat plates that are oriented to be perpendicular to both the truck bed floor and to the tailgate;
wherein the rearmost extension panel, the one or more intermediate extension panels, the frontmost extension panel are parallel to each other and adjacent to each other when the tailgate is in the nominal bed length position.

5. The extendable truck bed according to claim 4
wherein when the tailgate is moved to the nominal bed length position, the rearmost extension panel, the one or more intermediate extension panels, and the frontmost extension panel are compressed between the tailgate and the left side panel pocket, causing the rearmost extension panel, the one or more intermediate extension panels, and the frontmost extension panel to slide past each other to their adjacent positions inside of the left side panel pocket.

6. The extendable truck bed according to claim 5
wherein the left side panel pocket limits forward motion of the frontmost extension panel so that the frontmost extension panel does not exit the left side panel pocket completely;
wherein the plurality of right side extension panels and the right side panel pocket are mirror images of the plurality of left side extension panels and the left side panel pocket.

7. The extendable truck bed according to claim 6
wherein the left side panel pocket and the right side panel pocket each comprise a hollow space adjacent to a left side wall and a right side wall of the pickup truck, respectively;
wherein the rear side of the left side panel pocket and the rear side of the right side panel pocket are open so that the plurality of left side extension panels and the plurality of right side extension panels pass into and out of the left side panel pocket and the right side panel pocket.

8. The extendable truck bed according to claim 7
wherein the tailgate is a rear wall of the truck bed;
wherein the tailgate prevents a cargo from sliding out of the truck bed when the pickup truck is moved;
wherein when the tailgate is moved to the extended bed length position, the truck bed holds longer cargo items than when the tailgate is in the nominal bed length position.

9. The extendable truck bed according to claim 8
wherein the bottom of the tailgate is hinged and pivots around the left tailgate hinge and the right tailgate hinge;
wherein the tailgate is pivoted between an upright and closed position and a lowered position;
wherein in the upright and closed position the tailgate extends vertically up from the left tailgate hinge and the right tailgate hinge;
wherein in the lowered position the tailgate extends horizontally from the left tailgate hinge and the right tailgate hinge in a direction away from the cab of the pickup truck.

10. The extendable truck bed according to claim 9
wherein a right tailgate cable is coupled to the upper right end of the tailgate and prevents the tailgate from dropping;
wherein the right tailgate cable pulls on the tailgate to assist in closing it when the tailgate is in the upright and closed position;
wherein when the tailgate is pivoted to the lowered position, the right tailgate cable prevents the tailgate from dropping below a horizontal orientation.

11. The extendable truck bed according to claim 10
wherein the right tailgate cable is wrapped around a right cable spool;
wherein the right cable spool is a spring-tensioned spool;
wherein an internal spring within the right cable spool rotates the right cable spool in a direction that shortens the right tailgate cable by wrapping the right tailgate cable around the right cable spool;
wherein a left tailgate cable and a left cable spool are a mirror image of the right tailgate cable and the right cable spool.

12. The extendable truck bed according to claim 11
wherein a right electric motor is located in the right side wall of the truck bed;
wherein the right electric motor is oriented with its rotational axis horizontal and running front left to right;
wherein the right electric motor is powered from a vehicle electrical system and controlled from the one or more operator controls.

13. The extendable truck bed according to claim 12
wherein the right electric motor causes the tailgate to move between the nominal bed length position and the extended bed length position;
wherein the right electric motor is coupled to a right sprocket such that rotation of the right electric motor causes rotation of the right sprocket;
wherein a right flexible linkage is a linkage between the right sprocket and the right extension arm;
wherein the right sprocket engages with the right flexible linkage via a plurality of teeth on the right sprocket fitting into a plurality of notches on the right flexible linkage;
wherein rotation of the right electric motor is thus translated into linear motion of the right flexible linkage;
wherein a first end of the right flexible linkage is coupled to the right extension arm;
wherein a second end of the right flexible linkage is left uncoupled and is free to move as the right sprocket rotates;
wherein when the right sprocket rotates in a first rotational direction it causes the right flexible linkage to push the right extension arm towards the rear of the pickup truck, thus moving the tailgate to the extended bed length position;
wherein when the right sprocket rotates in a second rotational direction it causes the right flexible linkage to pull the right extension arm towards the front of the pickup truck, thus moving the tailgate to the nominal bed length position.

14. The extendable truck bed according to claim 13
wherein the direction of rotation of the right electric motor is determined by the polarity of the electrical energy applied to the right electric motor;
wherein the one or more operator controls blocks the flow of electrical energy to the right electric motor in which case the right electric motor stops rotating;
wherein the one or more operator controls applies electrical energy having a first polarity to the right electric motor, causing the right electric motor and the right sprocket to rotate in the first rotational direction;
wherein the one or more operator controls applies electrical energy having a second polarity to the right electric motor, causing the right electric motor and the right sprocket to rotate in the second rotational direction;
wherein a left electric motor, a left sprocket, a left flexible linkage, and a left linkage track are mirror images of the right electric motor, the right sprocket, the right flexible linkage, and the right linkage track.

15. The extendable truck bed according to claim 14
wherein the right electric motor and the left electric motor are wired to rotate in directions that complement each other;
wherein if the right electric motor is rotating in a direction that causes the tailgate to move towards the extended bed length position, then the left electric motor is also rotating in a direction that causes the tailgate to move towards the extended bed length position;
wherein if the right electric motor is rotating in a direction that causes the tailgate to move towards the nominal bed length position, then the left electric motor is also rotating in a direction that causes the tailgate to move towards the nominal bed length position.

* * * * *